Jan. 30, 1962

G. S. KNOX 3,018,791

VALVE CONTROL APPARATUS

Filed Aug. 8, 1958

GRANVILLE S. KNOX,
INVENTOR.

BY White & Haefliger

ATTORNEYS.

Jan. 30, 1962   G. S. KNOX   3,018,791
VALVE CONTROL APPARATUS
Filed Aug. 8, 1958   4 Sheets-Sheet 2

GRANVILLE S. KNOX,
INVENTOR.

BY *White & Haefliger*

ATTORNEYS.

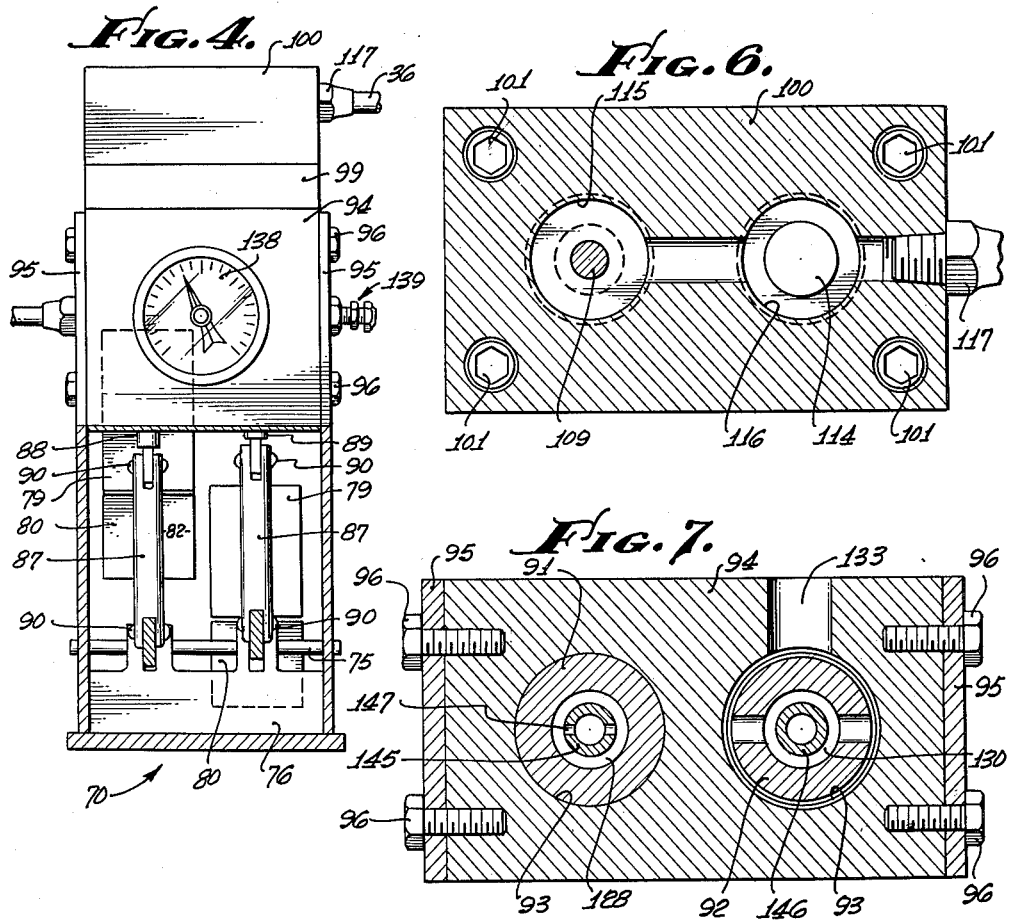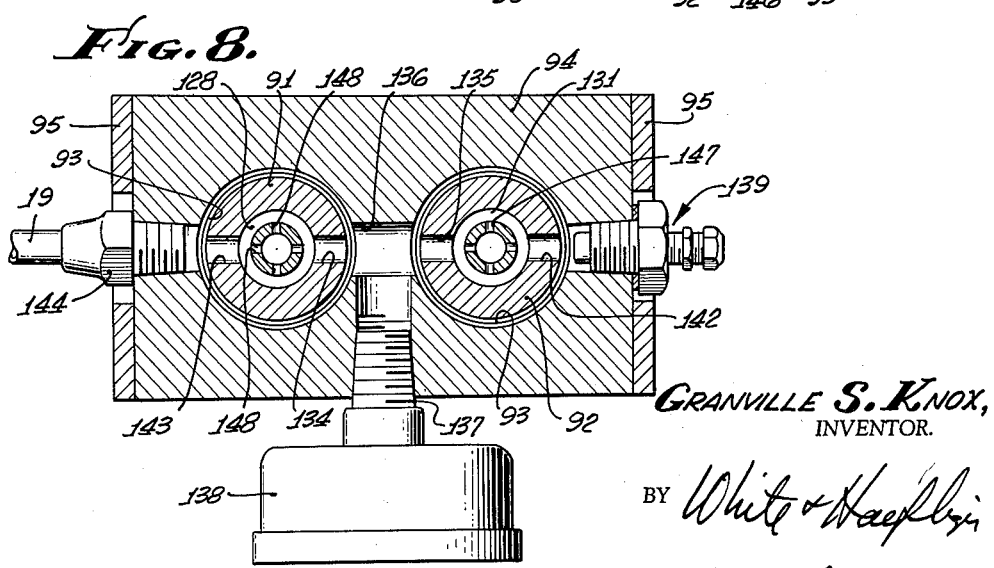

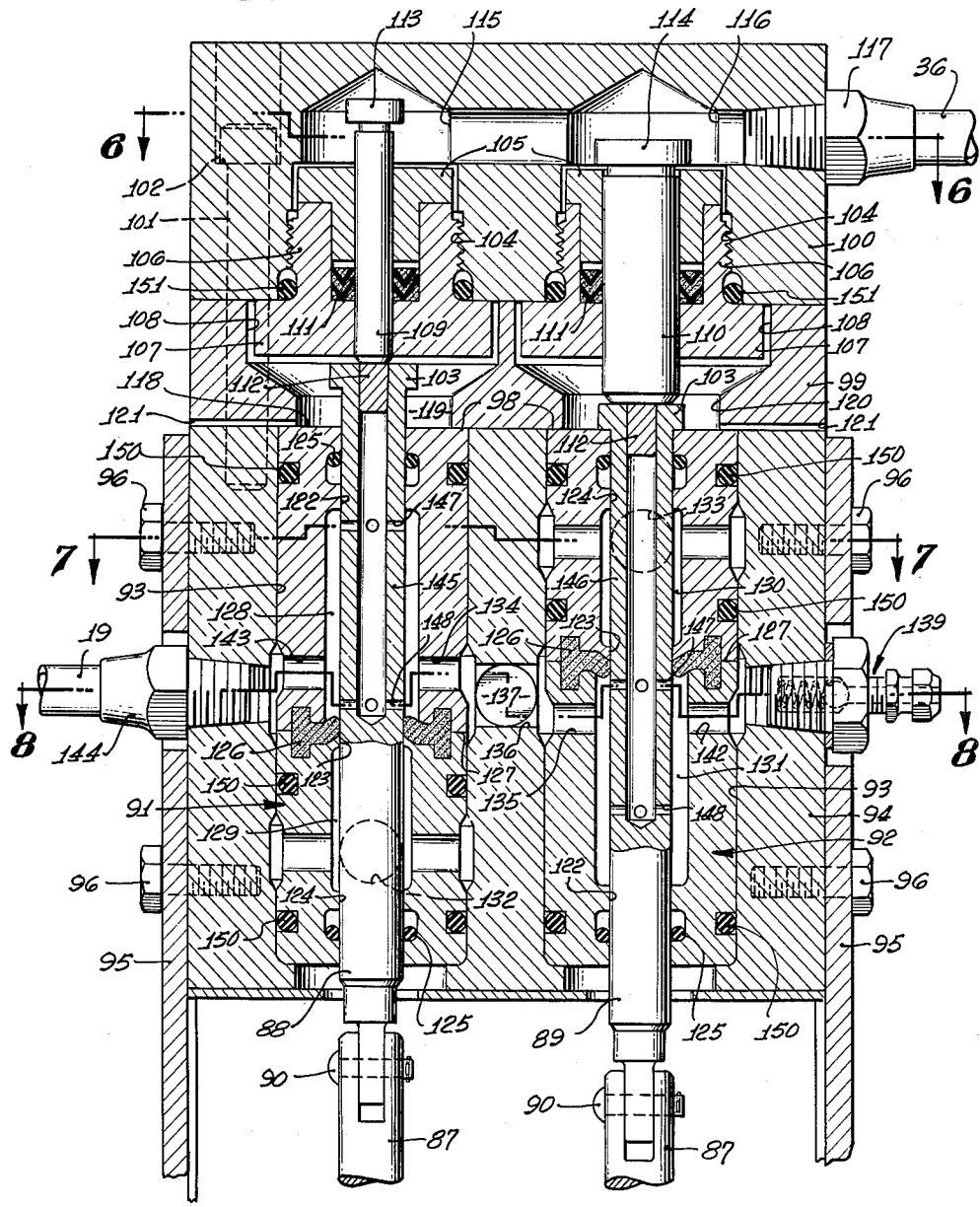

United States Patent Office 3,018,791
Patented Jan. 30, 1962

3,018,791
VALVE CONTROL APPARATUS
Granville S. Knox, Glendale, Calif., assignor to Hydril Company, Los Angeles, Calif., a corporation of Ohio
Filed Aug. 8, 1958, Ser. No. 754,001
18 Claims. (Cl. 137—458)

This invention relates generally to improvements in means for controlling the operation of fluid pressure operated safety valves, and more particularly has to do with apparatus for controlling fluid pressure exerted on a safety valve part or mechanism that is operable to close the valve shutting off flow therethrough whenever the flow pressure upstream or downstream of the safety valve differs from predetermined pressure limits. The present invention is furthermore concerned with improvements over the pressure control device disclosed in my copending application Serial Number 625,880, filed December 3, 1956, now abandoned.

In prior control devices of this sort, establishment of the desired flow pressure range, above or below which the flow was to be interrupted, was secured by utilizing one or more springs biasing control valves open or closed as the design required, the springs being operative to actuate the control valve when the flow pressure exceeded or dropped below the spring established high or low value. Such devices, once designed and built for a particular application in holding a safety valve open to pass the flow when the pressure thereof is above or below a certain value or values, cannot be easily changed to provide a wide range of adjustment as respects altering the flow pressure values above or below which the safety valve may be closed, inasmuch as the springs built into the system are normally effective to exert only predetermined amounts of force for actuating the control valve or valves. Furthermore, if such prior devices were to incorporate means for increasing or reducing the spring tension or compression so as to change the high or low flow pressure at which the safety valve closed, it would be quite difficult to determine what the newly established high or low actuating pressure in fact was, since springs are not readily capable of giving an accurate indication of the force they exert.

In order to overcome the above difficulties, the present invention has for its major object the provision of a simply constructed, durable control device that is highly sensitive to control pressure variations and capable of operating with speed and precision to effect closure of a main safety flow valve when the control pressure goes out of a predetermined range. The control apparatus basically comprises valving means for blocking a change in the fluid pressure exerted on the safety valve part, said valving means being movable to unblock said fluid pressure change in response to application on said means of control pressure altered from a predetermined value, and force applying means including a weight acting on or biasing said movable valving means for opposing said control pressure application thereon to establish the predetermined value of control pressure. As used herein, the term "flow" will refer to the main stream flow through the safety or main valve, while the term "fluid" will refer to any fluid the changing pressure of which operates the flow valve in response to a predetermined change in flow pressure. Also, the expression "control pressure" contemplates any gas or liquid control pressure, but will be described as the pressure of the flow passing through the safety valve.

An important feature of this invention is the novel, pressure sensitive, valving and biasing arrangement which causes the control apparatus to pass through a state of complete pressure balance prior to the start of operation of the valving means so that once started no further increase or decrease in the control or flow pressure is required to effect a rapid completion of the cycle of operation. This is in contrast to control devices that operate in a sluggish manner because as the cycle of operation begins there is a constant increase in the resistance to further operation which can be overcome only by an additional increase or decrease as the case may be in the force which initiated the cycle of operation.

The force applying means preferably includes a lever or levers through which the weight or weights act on the valving means, the force applying means being easily adjustable, as for example by altering the leverage exerted on the movable control valving means, so that the predetermined value of control or flow pressure above or below which the safety valve is to be closed may be readily and accurately known and varied. For example, the invention specifically contemplates the provision of a lever having calibrations thereon, with a weight being shiftable along the lever to any desired position with respect to the calibrations for selecting the predetermined flow pressure sought to be established, as indicated by the calibrations. Positive and rapid operation of the control apparatus to secure closure of the safety valve is assured by the particular fulcruming of the lever acting on the control valving means, by mounting the weight on the lever so that the weight center of gravity is offset from the lever axis, and by using pressure balanced, sleeve type control valving means with sleeve bearings to guide sliding movement of the valves almost without friction, all of which will be described.

Furthermore, the force applying means preferably includes a pair of levers and weights acting respectively through the levers for opposing flow pressure application on the movable means to establish upper and lower limits of a flow pressure range above and below which closure of the safety valve is desired. Thus, the invention contemplates lifting and lowering of the respective weights on their levers in response to increasing and decreasing of the flow pressure respectively above and below the pressure range, such lifting and lowering of the weights being accompanied by unblocking of fluid pressure exerted on the safety valve part operable to close the safety valve shutting off flow therethrough.

These and other objects of the invention, as well as the details of an illustrative embodiment, will be more fully understood from the following detailed description of the drawings, in which:

FIG. 4 is a view taken on line 4—4 of FIG. 2;

FIG. 5 is an enlarged vertical section taken on line 5—5 of FIG. 2;

FIG. 6 is a reduced section taken on line 6—6 of FIG. 5;

FIG. 7 is a reduced section taken on line 7—7 of FIG. 5;

FIG. 8 is a reduced section taken on line 8—8 of FIG. 5;

Figure 1:
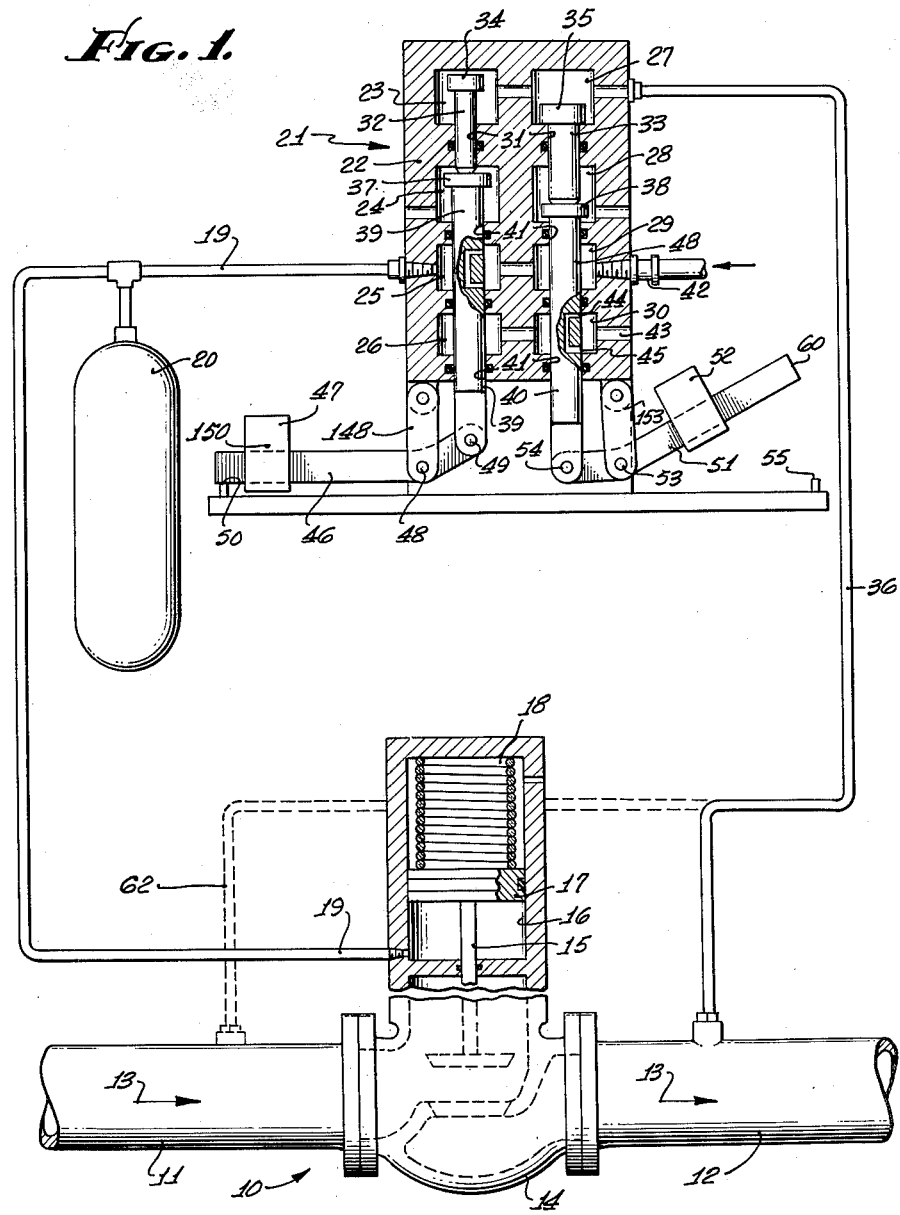
FIG. 1 shows a schematic form of the safety valve control apparatus connected in controlling relation with a safety valve.

Referring first to FIG. 1, a typical safety valve is generally indicated at 10 as being connected in a flow conduit indicated by the pipes 11 and 12 upstream and downstream of the safety valve, the direction of flow through the valve being indicated by the arrows 13. The safety valve 10 includes a body 14 within which a stopper is movable up and down to open and close the valve by a stopper stem 15, shown projecting upwardly into a chamber 16 above the valve body. A valve part or piston 17 operable to open and close the safety valve is urged downwardly by a compression spring 18 above the piston, and is also urged upwardly by fluid pressure transmitted to the chamber 16 below the piston through a line 19 connected into the chamber. It will be understood that when the fluid pressure transmitted to the chamber 16 is insufficient to lift the piston 17 and compress the spring 18, the valve will be closed by the spring. It will also be understood that such fluid pressure is normally sufficient to maintain the valve 10 in open condition as a result of direct communication to chamber 16 of fluid pressure in a bottle 20 connected into the line 19.

The apparatus for controlling the fluid pressure in the line 19 is generally indicated at 21 to include a housing 22 having two series of vertically spaced chambers 23 through 26, and 27 through 30. Received within vertical bores 31 in the housing are high pressure and low pressure pistons 32 and 33, having flanged heads 34 and 35 integral with their respective upper ends and within interconnected chambers 23 and 27 for receiving application of flow pressure conducted to these chambers from a pipe 36 connected into the conduit 12 downstream of the safety valve 14. The lower ends of the pistons 32 and 33 engage the flanges 37 and 38 of vertical valve rods 39 and 40 projecting upwardly into the chambers 24 and 28.

The valve rods 39 and 40 extend vertically through the chambers 25 and 26 and the chambers 29 and 30 respectively, and are slidably received within bores 41 above and below and separating these chambers, as shown.

Interconnected chambers 25 and 29 are in communication with the fluid pressure line 19 connected into the housing 22, fluid pressure being chargeable into the bottle 20 through a ball check valve 42 connected into the housing 21 so that the charging pressure passes from the ball check valve through the chambers 29 and 25 before it enters the line 19. Interconnected chambers 26 and 30 on the other hand are vented to the exterior at 43, and the valve rods have axially spaced ports 44 and 45 which when brought into communication with the vertically spaced chambers 25 and 26, or chambers 29 and 30, pass or bleed the pressure in line 19 and the bottle 20 to the exterior through the vent 43.

Normally the valve rods block such venting of fluid pressure in the line 19, which effects closure of the safety valve 10, since the ports 44 and 45 are not in communication with both chambers 25 and 26, and 29 and 30, these ports in the valve rods normally being in the positions shown in FIG. 1. At such times, the piston 32 is held in an upward position by upward force transmitted to the valve rod 39 by a lever 46 and a weight 47 on the lever. Lever 46 is fulcrumed at 48 by pivotal connection to a hanger link 148 and is pivotally connected to the valve rod at 49, a stop 50 limiting counter-clockwise pivoting of the lever. Likewise, the piston 33 is normally held in a downward position by flow pressure communicated to chamber 27 through piping 36, a second lever 51 and a weight 52 thereon acting to apply upward force on the valve rod 40 in opposition to the downward force exerted thereon. Lever 51 is fulcrumed at 53 by pivotal connection to a hanger link 153, and is pivotally connected to the valve rod 40 at 54, a seat or stop 55 being provided for limiting clockwise pivoting of that lever. The hanger links 148 and 153 are pivotally connected to the housing 22 to allow lateral shifting of the levers 46 and 51 during valve rod axial displacement, thereby preventing binding of the valve rods 39 and 40 in the housing bores 41.

In considering the operation of the safety valve control apparatus, should the flow pressure downstream of the safety valve 10 drop below a predetermined value established by the upward force applied by the weight 52 acting through the lever 51 on the valve rod 40, the lever 51 will pivot clockwise lifting the valve rod 40 so that port 44 will be brought into communication with the chamber 29 when the port 45 is still communicating with the chamber 30. As a result, the pressure in line 19 will be rapidly bled or vented at 43, thereby allowing the safety valve compression spring 18 to close the safety valve. To open the safety valve it is then necessary to lift the lever 51 at its free end 60 to the position shown in FIG. 1 and then charge sufficient pressure through the ball check valve 42, chambers 29 and 25, and into line 19 and the bottle 20 so as to cause the safety valve piston 17 to rise against the force of the compression spring 18.

On the other hand, if the flow pressure downstream of the safety valve 10 exceeds an amount predetermined by the upward force exerted by the weight 47 through the lever 46 upon the valve rod 39, the piston 32 will be moved downwardly displacing the valve rod 39 downwardly and bringing the ports 44 and 45 into communication with both chambers 25 and 26, thereby venting the fluid pressure in the line 19, and causing the safety valve to close. To reopen the safety valve it is necessary to push downwardly on lever 46, pivoting it counter-clockwise to the position shown in FIG. 1, and thereafter charge sufficient pressure through the ball check valve 42 and into line 19 and bottle 20 so as to cause the safety valve piston 17 to rise against the force exerted by the compression spring 18.

It will be understood that the connection of line 36 into the downstream flow conduit 12 may be replaced by connection of that line into the upstream conduit 11, as indicated by the broken lines 62. It will also be understood that the weights 47 and 52 may be shifted along the levers 46 and 51 to select the predetermined upper and lower values of flow pressure above and below which shutting of the safety valve is desired. Thus, the positions of the weights 47 and 52 on their respective levers determine the range of flow pressure within which the safety valve is to remain open and outside which the safety valve is to be closed automatically.

Figure 9:
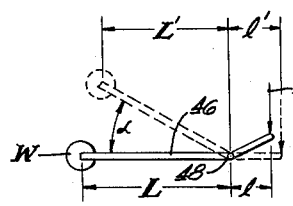
FIG. 9 is a schematic analysis of changes in the effective arm lengths of a lever shown in FIG. 1, during lever rotation and due to preferred fulcruming of the lever.

It will be observed from FIG. 1 that lever 46 is effectively fulcrumed at 48 generally below a straight line running from the pivotal connection 49 between the lever and valve rod 39 to the approximate center of gravity 150 of the weight 47 connected to lever 46, this same relationship being true as regards the lever and weight acting on valve rod 40. This preferred arrangement is schematically illustrated in FIG. 9, in which the lever 46 fulcrumed at 48 is shown to have arms of effective length $L$ and $l$ respectively acted on by the weight $w$ and by the downward force $F$ exerted by the flow pressure. When the lever pivots clockwise to the broken line position illustrated in response to an increase in $F$ above the predetermined range, the lever arms then have effective length $L'$ and $l'$. Since $L'$ is shown to be less than $L$ and since $l'$ is greater than $l$, it is readily seen that when $F$ increases slightly beyond the upper limit of the predetermined range the resultant moment of force exerted by $F$ about the fulcrum point 48 increases as the lever pivots clockwise, whereas the moment of force exerted by the weight $w$ about point 48 decreases, so that instability increases without any further increase in $F$. Thus, the lever continues to rotate with acceleration until piston flange 34 in FIG. 1 seats against the lower wall of chamber 23.

Figure 10:
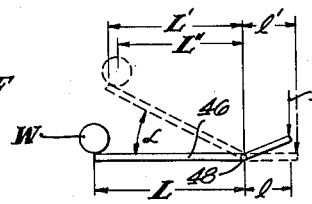
FIG. 10 is a schematic analysis similar to FIG. 9, showing changes in effective lever arm lengths due to preferred mounting of a weight acting on the lever.

Such accelerated lever rotation is enhanced by mounting the weight 47 so that its center of gravity lies above the effective axis of the lever arm upon which it acts, as seen in FIG. 1, and as shown schematically in FIG. 10. Thus, as the weight $w$ pivots clockwise, its center of gravity shifts horizontally rightwardly with respect to the lever, acting upon a lever arm of effectively reduced length $L''$ after the lever has rotated through an angle and to the broken line position shown. These geometrical arrangements and considerations as illustrated in FIGS. 9 and 10 are likewise applicable to the lever and weight system 51 and 52 illustrated in FIG. 1.

Figure 2:
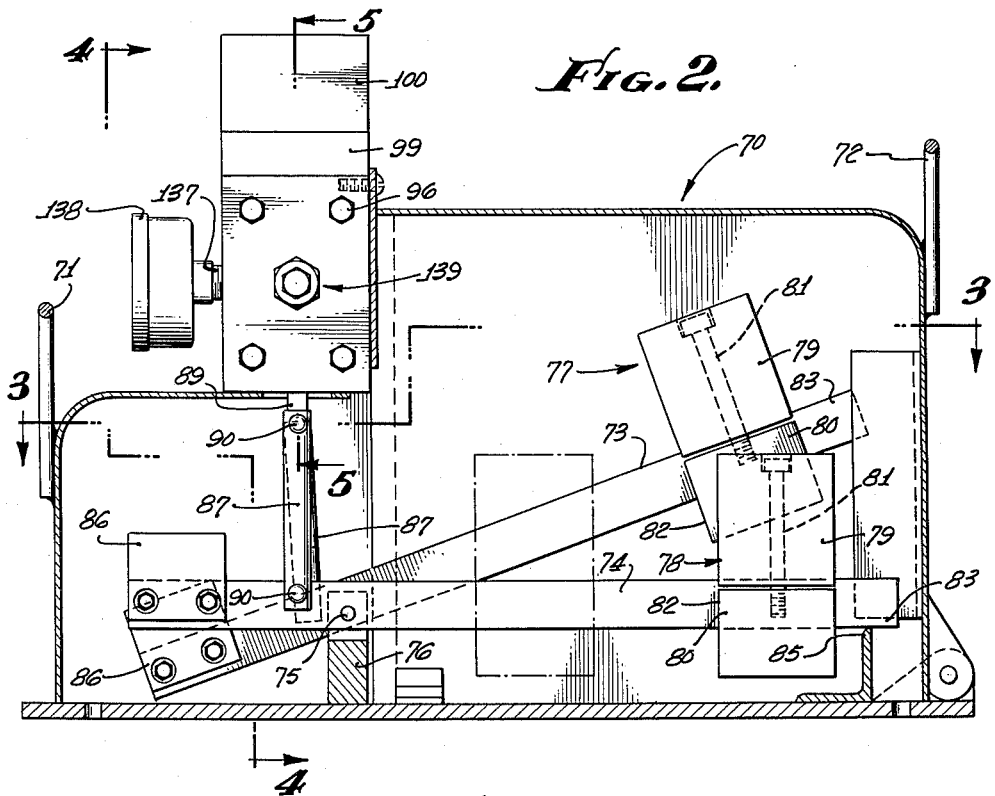
FIG. 2 is a vertical section taken through a modified form of the control apparatus.
Figure 3:
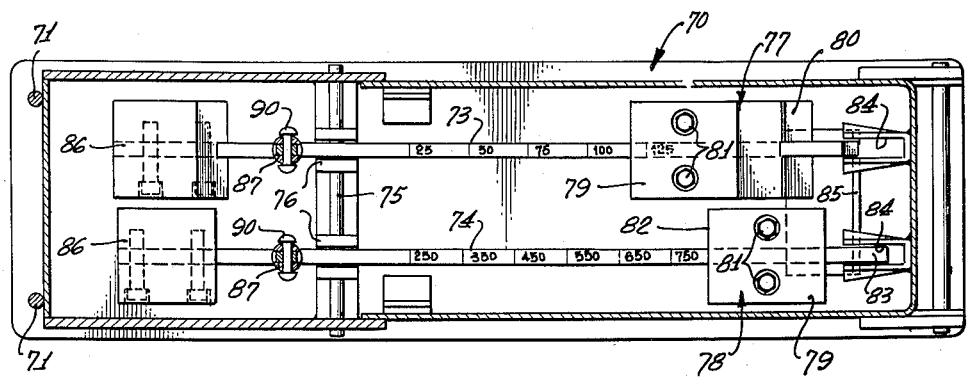
FIG. 3 is a view taken on line 3—3 of FIG. 2.

Referring now to FIGS. 2 through 8, a specific embodiment or construction of the safety valve control apparatus will now be described. In FIGS. 2 through 4, the housing for the weights and levers is shown at 70, front and rear handles 71 and 72 being provided for lifting the housing. The two levers 73 and 74 extend in side-by-side relation and are pivoted at 75 about the same horizontally extending pin carried by a support 76. Weights 77 and 78 are carried by the levers forwardly of the pin 75, each of the weights including separate upper and lower parts 79 and 80 extending above and below the lever, and held releasably clamped thereto by screws 81 engaging the upper and lower parts of the weights. Each of the lower parts is appropriately grooved to receive a lever therethrough, for guiding the weights during shifting thereof lengthwise along the levers after the screws 81 have been loosened to allow such shifting. Appropriate pressure indicating indicia on the levers are seen in FIG. 3, the rear faces 82 of the weights being registerable with the indicia lines for selection or establishment of desired predetermined values of flow pressure above and below which operation of the safety valve is desired.

The forward end portions 83 of the levers are guided during their pivoting in laterally spaced vertically extending channels 84 to prevent sidewise deflection of the levers, and their downward swinging movement is limited by engagement with the laterally extending stop bracket 85. Each of the levers also mounts a fixed counterweight 86, the latter and weights 77 and 78 having their centers of gravity above the effective axes of levers 73 and 74 respectively.

Also connected with each of the levers rearwardly of the pivot 75 is a link 87 for transmitting force to the valve rods 88 and 89 shown in FIG. 5, suitable pivot connections between the links 87, the valve rods 88 and 89, and the levers 73 and 74 being shown at 90. Valve rods 88 and 89 are received in like but oppositely endwise oriented guide sleeve assemblies 91 and 92 fitted in vertical bores 93 formed in a body 94. The latter is carried by the housing 70 directly above the links 87 by side plates 95 connected to the housing and also to the body 94 by cap screws 96.

The sleeve assemblies 91 and 92 are held in the body 94 at 98 by a spacer 99 overlying the top surface of the body 94. The spacer is in turn held in position by a head 100 overlying the spacer, cap screws 101 being provided and extending downwardly from counterbore shoulders 102 in the head through the spacer and into the body. These screws are removable to permit removal of the head and spacer off the body thereby exposing the flanged upper ends 103 of the valve rods 88 and 89, and also the guide sleeve assemblies 91 and 92, facilitating their removal and replacement.

The head 100 contains threaded bores 104 in axial alignment with the valve rods 88 and 89, each of the bores receiving a seat 105 and a cap 106 connected with and holding the seat in position in the bore, both the cap and the seat being tubular. Each cap includes a flange 107 received in a bore enlargement 108 in the spacer and held against the underside of head 100 by threaded connection of the cap shank in the bore 104. Axially extending pistons 109 and 110 are reciprocable axially and vertically within the tubular caps and seats 105 and 106, chevron type packings 11 sealing off between the pistons and the caps. At their lower ends the pistons engage the flanged upper ends 103 of the valve rods 88 and 89 and also inserts 112 sealingly secured within the tubular flanged ends 103. Piston heads 113 and 114 integral with the pistons 109 and 110 respectively, are movable up and down in the head 100 within the interconnecting chambers 115 and 116 to which the pressure of the flow through the safety valve is communicated as through a line 36 as previously described and a fitting 117 threaded into the head 100.

Downward movement of the pistons 109 and 110 is limited by engagement of the flanged upper ends 103 of the valve rods with the upper end surfaces 118 of the guide sleeve assemblies 91 and 92, the chambers 119 and 120 receiving these flanged ends 103 being vented to the atmosphere at 121.

The valve rods 88 and 89 are guided during their upward and downward movement by vertically spaced and aligned bores 122, 123 and 124 formed in the endwise oppositely oriented guide sleeve assemblies 91 and 92, suitable O rings 125 sealing off between the valve rods and the sleeve assemblies. T cross-section packing rings 126 seal off between the valve rods 88 and 89 and the sleeve assemblies and also between the upper and lower portions of the sleeve assemblies which are in end-to-end engagement at 127. Finally, the packings 126 seal off between the upper and lower chambers 128 and 129 in the sleeve assembly 91 and the upper and lower chambers 130 and 131 in the other sleeve assembly 92.

Chambers 128 and 129 correspond to chambers 25 and 26 of FIG. 1, whereas chambers 130 and 131 correspond to chambers 30 and 29 in FIG. 1. Thus, chambers 129 and 130 are vented to the atmosphere as indicated by the broken line circular vents 132 and 133 communicating with the chambers 129 and 130 respectively. Chambers 131 and 128 are in communication through ports 134 and 135 in the sleeve assemblies 91 and 92 respectively and through a connecting port 136 with which the tubular stem 137 of a pressure gauge 138 is in communication, as seen in FIGS. 2, 4, 5 and 8. Thus, the pressure gauge registers the fluid pressure charged into the bottle 20 in line 19 through the ball check valve indicated at 139 as connected into the body 94, ports 142 and 135 in the sleeve assembly 92, port 136 in body 94, ports 134 and 143 in the sleeve assembly 91, and finally through the fitting 144 with which line 19 is connected.

As shown in FIG. 5 the upper portions 145 and 146 of the valve rods 88 and 89 are tubular and contain axially spaced ports 147 and 148 extending radially through the tube walls. Both of these ports in valve rod 88 are normally in communication with chamber 128 and out of communication with vented chamber 129, whereas both of these ports in valve rod 89 are normally in communication with chamber 131 and out of communication with vented chamber 130 in sleeve 92. By "normally" is meant the times when the flow pressure in line 36 and exerted downwardly against the pistons 109 and 110 is within the range set or predetermined by the weights 77 and 78 acting through their associated levers. If however that flow pressure should rise above the predetermined limit set by the weight 78, the piston 109 will be forced downwardly by the flow pressure, the weight 78 will swing upwardly, and the ports 148 in the valve rod 88 will come into communication with the vented chamber 129 at the time when the ports 147 in that valve rod are in communication with the chamber 128, and therefore the pressure in line 19 will be suddenly vented to accomplish closing of the safety valve. On the other hand, should the flow pressure communicated to the piston 110 drop below the predetermined limit or value established by the weight 77 acting through the lever 73, that weight and lever will pivot clockwise as viewed in FIG. 2 lifting the valve rod 89 to vent the fluid pressure holding the safety valve open, via chamber 131, ports 148 and 147, and vented chamber 130, it being understood that chambers 128 and 131 remain in communication with line 19 at all times through the ports previously described.

After such actuation of the levers associated with closing of the flow valve, the latter can be opened only by charging fluid pressure back into the reservoir or bottle as seen at 20 in FIG. 1 through the ball check valve 139. But this can only be done if the levers and weights are pivoted to their original positions as viewed in FIG. 2, since the charging pressure would otherwise be vented. Accordingly, it is necessary to open up the housing 70 and reset the levers and weights before recharging of the fluid pressure and reopening of the safety valve can be accomplished.

As shown in FIG. 5, suitable O rings 150 and 151 are provided to seal off between the sleeve assemblies 91 and 92 and the body 94 and between the caps 106 and the head 100.

I claim:

1. Control apparatus of the character described, comprising a container for constant auxiliary fluid pressure in a line to be exerted on a safety valve part operable to close the safety valve shutting off flow therethrough of main stream fluid pressure subject to variation, a housing having inlet and outlet passages, first and second means in the housing communicating with said container and each being operable to block escape of auxiliary fluid pressure through said passages and individually movable to unblock auxiliary fluid pressure escape in response to application on said respective means of main stream pressure increased above and decreased below a predetermined main stream pressure range, said housing having an inlet for said main stream pressure and each of said means including a piston communicating with said main stream pressure inlet and against which said main stream pressure is applicable, and force applying means including first and second levers and weights acting through said respective levers on said first and second movable means for opposing said main stream pressure application thereon thereby to establish the upper and lower limits of said main stream pressure range.

2. The invention as defined in claim 1 in which each of said first and second means includes an axially elongated valving member having intercommunicating axially spaced ports therein, said member being axially movable from a first position in which said ports communicate with only one of said inlet and outlet passages to a second position in which said ports communicate with both of said inlet and outlet passages for passing escaping auxiliary fluid pressure therethrough.

3. The invention as defined in claim 2 in which said member comprises a tube.

4. The invention as defined in claim 2 in which said pistons and said force applying means are at opposite ends of said members.

5. The invention as defined in claim 4 including guide sleeves in said housing receiving said elongated members and ports in said sleeves in communication with said members and with said housing inlet and outlet passages.

6. The invention as defined in claim 5 including annular seals carried by said sleeves sealing off between said sleeves and said members and said sleeves and said housing to prevent leakage of auxiliary pressure fluid therebetween.

7. The invention as defined in claim 4 in which said housing includes a body having parallel bores receiving said elongated members, and a head having parallel bores receiving said pistons, said head being removable off said body to expose said elongated valving members.

8. The invention as defined in claim 1 including means acting to fulcrum each lever at a location offset below a line extending between the center of gravity of the weight acting on the lever and the point at which the lever acts on said movable valving means.

9. The invention as defined in claim 8 in which the weight center of gravity is above the axis of the lever arm along which the weight is shiftable.

10. Control apparatus of the character described, comprising a container in the form of a pressure vessel for substantially constant auxiliary fluid pressure to be exerted on a safety valve part that is operable outside said container vessel to close the safety valve shutting off flow therethrough of main stream fluid pressure subject to variation, chamber means having inlet and outlet ports, plural movable means in said chamber means and communicating with said container for blocking escape through said ports of said auxiliary fluid pressure and movable to unblock said auxiliary fluid pressure escape in response to application on one of said movable means of predetermined high main stream pressure and to application on another of said movable means of predetermined low main stream pressure, said chamber means having another inlet for said main stream pressure and in communication with the movable means, and force applying means including weight means acting on said movable means for opposing said main stream fluid pressure application thereon to establish said predetermined high and low main stream pressures.

11. Control apparatus of the character described, comprising a container in the form of a pressure vessel for substantially constant auxiliary fluid pressure in a line to be exerted on a safety valve part operable outside said container vessel to close the safety valve shutting off flow therethrough of main stream fluid pressure subject to variation, chamber means having inlet and outlet ports, plural movable means in said chamber means and communicating with said container for blocking escape through said ports of said auxiliary fluid pressure and movable to unblock said auxiliary fluid pressure escape in response to application on one of said movable means of predetermined high main stream pressure and to application on another of said movable means of predetermined low main stream pressure, said chamber means having another inlet for said main stream pressure and in communication with the movable means, and force applying means including lever means and weight means acting through said lever means on said movable means for opposing said main stream fluid pressure application thereon to establish said predetermined high and low main stream pressures.

12. Control apparatus of the character described, comprising a container in the form of a pressure vessel for substantially constant auxiliary fluid pressure in a line to be exerted on a safety valve part operable outside said container vessel to close the safety valve shutting off flow therethrough of main stream fluid pressure subject to variation, chamber means having inlet and outlet ports, plural movable means in said chamber means and communicating with said container for blocking escape through said ports of said auxiliary fluid pressure and movable to unblock said auxiliary fluid pressure escape in response to application on one of said movable means of predetermined high main stream pressure and to application on another of said movable means of predetermined low main stream pressure, said chamber means having another inlet for said main stream pressure and in communication with the movable means, and force applying means including lever means and weight means acting through said lever means on said movable means for opposing said main stream fluid pressure application thereon to establish said predetermined high and low main stream pressures, said weight means being shiftable along said lever means to vary said predetermined high and low main stream pressures, and means releasably attaching said weight means to said lever means.

13. Control apparatus of the character described, comprising a container in the form of a pressure vessel for substantially constant auxiliary fluid pressure in a line to be exerted on a safety vale part operable outside said container vessel to close the safety valve shutting off flow therethrough of main stream fluid pressure subject to variation, chamber means having inlet and outlet ports, plural movable means in said chamber means and communicating with said container for blocking escape through said ports of said auxiliary fluid pressure in response to application on one of said movable means of predetermined high main stream pressure and to application on another of said movable means of predetermined low main stream pressure, said chamber means having another inlet for said main stream pressure and in communication with the movable means, and force applying means including a pair of levers and weights acting respectively through said levers on said movable means for opposing the main stream fluid pressure application thereon to establish said high and low main stream pressures, said movable blocking means being movable to lift and lower said respective weights in response to increasing and decreasing of said main stream pressure respectively above and below said high and low pressures.

14. Control apparatus of the character described, comprising a container in the form of a pressure vessel for substantially constant auxiliary fluid pressure in a line to be exerted on a safety valve part operable outside said container vessel to close the safety valve shutting off flow therethrough of main stream fluid pressure subject to variation, chamber means having inlet and outlet ports, plural movable means in said chamber means and communicating with said container for blocking escape through said ports of said auxiliary fluid pressure in response to application on one of said movable means of predetermined high main stream pressure and to application on another of said movable means of predetermined low main stream pressure, said chamber means having another inlet for said main stream pressure and in communication with the movable means, said movable means including piston means against which said main stream pressure is applicable for moving said movable means, and force applying means including a pair of levers and weights acting respectively through said levers on said movable means for opposing said main stream fluid pressure application thereon to establish said high and low main stream pressures, said movable means being movable to lift and lower said respective weights in response to increasing and decreasing of said main stream pressure respectively above and below said high and low pressures.

15. Control apparatus of the character described, comprising a container in the form of a pressure vessel for substantially constant auxiliary fluid pressure in a line to be exerted on a safety valve part operable outside said container vessel to close the valve shutting off flow therethrough of main stream fluid pressure subject to variation, chamber means having inlet and outlet ports, first and second valving means within said chamber means and communicating with said container each being operable to block escape through said ports of said auxiliary fluid pressure and individually movable to unblock said auxiliary fluid pressure escape in response to application on said respective valving means of pressure increased above and decreased below a predetermined pressure range, each of said valving means including a piston against which said main stream pressure is applicable, said chamber means having another inlet for said main stream pressure and in communication with said valving means and force applying means including first and second levers and weights acting through said respective levers on said first and second movable valving means for opposing said main stream pressure application thereon thereby to establish the upper and lower limits of said main stream pressure range.

16. The invention as defined in claim 15 in which said weights are shiftable along said levers to vary said predetermined flow pressure range, and including means releasably attaching said weights to said levers.

17. The invention as defined in claim 16 including means pivoting said levers to lift and lower said weights in response to increasing and decreasing of said main stream pressure respectively above and below said pressure range.

18. The invention as defined in claim 17 in which said levers have numbered indicia spaced therealong for indicating the positions to which said weights should be shifted for establishing desired upper and lower limits of said flow pressure range.

References Cited in the file of this patent

UNITED STATES PATENTS

| | | |
|---|---|---|
| 1,211,599 | Lalor | Jan. 9, 1917 |
| 1,302,538 | Gulick | May 6, 1919 |
| 1,380,415 | Putnam | June 7, 1921 |
| 1,673,041 | Connet | June 12, 1928 |
| 2,566,772 | Otis | Sept. 4, 1951 |
| 2,566,774 | Otis | Sept. 4, 1951 |
| 2,645,450 | Chessman | July 14, 1953 |
| 2,679,261 | Otis | May 25, 1954 |
| 2,693,819 | Otis | Nov. 9, 1954 |
| 2,702,051 | Welty | Feb. 15, 1955 |
| 2,734,529 | Harrison | Feb. 14, 1956 |